United States Patent
Shook et al.

(10) Patent No.: US 12,429,045 B2
(45) Date of Patent: Sep. 30, 2025

(54) PRESSURE SENSITIVE STOP STROKE FOR VARIABLE DISPLACEMENT PUMPS

(71) Applicant: Hamilton Sundstrand Corporation, Charlotte, NC (US)

(72) Inventors: Ryan Shook, Loves Park, IL (US); Ryan Prescott Susca, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 118 days.

(21) Appl. No.: 18/202,404

(22) Filed: May 26, 2023

(65) Prior Publication Data
US 2024/0392772 A1    Nov. 28, 2024

(51) Int. Cl.
F04B 49/16    (2006.01)
F04B 49/22    (2006.01)

(52) U.S. Cl.
CPC .............. F04B 49/16 (2013.01); F04B 49/22 (2013.01)

(58) Field of Classification Search
CPC .................................. F04B 49/16; F04B 49/22
See application file for complete search history.

(56) References Cited

U.S. PATENT DOCUMENTS

| | | | |
|---|---|---|---|
| 4,951,462 A * | 8/1990 | Graf | F16H 61/423 60/491 |
| 5,806,300 A | 9/1998 | Veilleux et al. | |
| 6,048,177 A * | 4/2000 | Erkkilae | F04B 49/065 417/222.1 |
| 6,209,825 B1 | 4/2001 | Scott | |
| 7,431,569 B2 | 10/2008 | Griffiths | |
| 9,234,464 B2 | 1/2016 | Benson | |
| 9,869,311 B2 | 1/2018 | Du et al. | |
| 2004/0200459 A1 | 10/2004 | Bennett et al. | |
| 2008/0289338 A1 | 11/2008 | Desai | |
| 2013/0098022 A1 | 4/2013 | Kim et al. | |
| 2018/0340501 A1* | 11/2018 | Ni | F04B 49/08 |
| 2018/0372006 A1 | 12/2018 | Chalaud et al. | |
| 2022/0372968 A1 | 11/2022 | O'Rorke et al. | |

FOREIGN PATENT DOCUMENTS

EP    4063654 A2    9/2022

OTHER PUBLICATIONS

Extended European Search Report for EP Application No. 24177411. 6, Dated Oct. 18, 2024, pp. 6.

* cited by examiner

Primary Examiner — Connor J Tremarche
(74) Attorney, Agent, or Firm — Kinney & Lange, P.A.

(57) ABSTRACT

A system includes a variable displacement pump (VDP) in fluid communication with an inlet line and with an outlet line. The VDP includes a variable displacement mechanism configured to vary pressure to the outlet line. The VDP includes a variable stop configured to vary minimum displacement of the variable displacement mechanism based on position of the variable stop relative to a housing of the VDP. A pressure sensing valve (PSV) is operatively connected between the inlet line and the outlet line to actuate a stop member to adjust stopping position of the variable stop based on pressure differential between the inlet line and the outlet line.

19 Claims, 1 Drawing Sheet

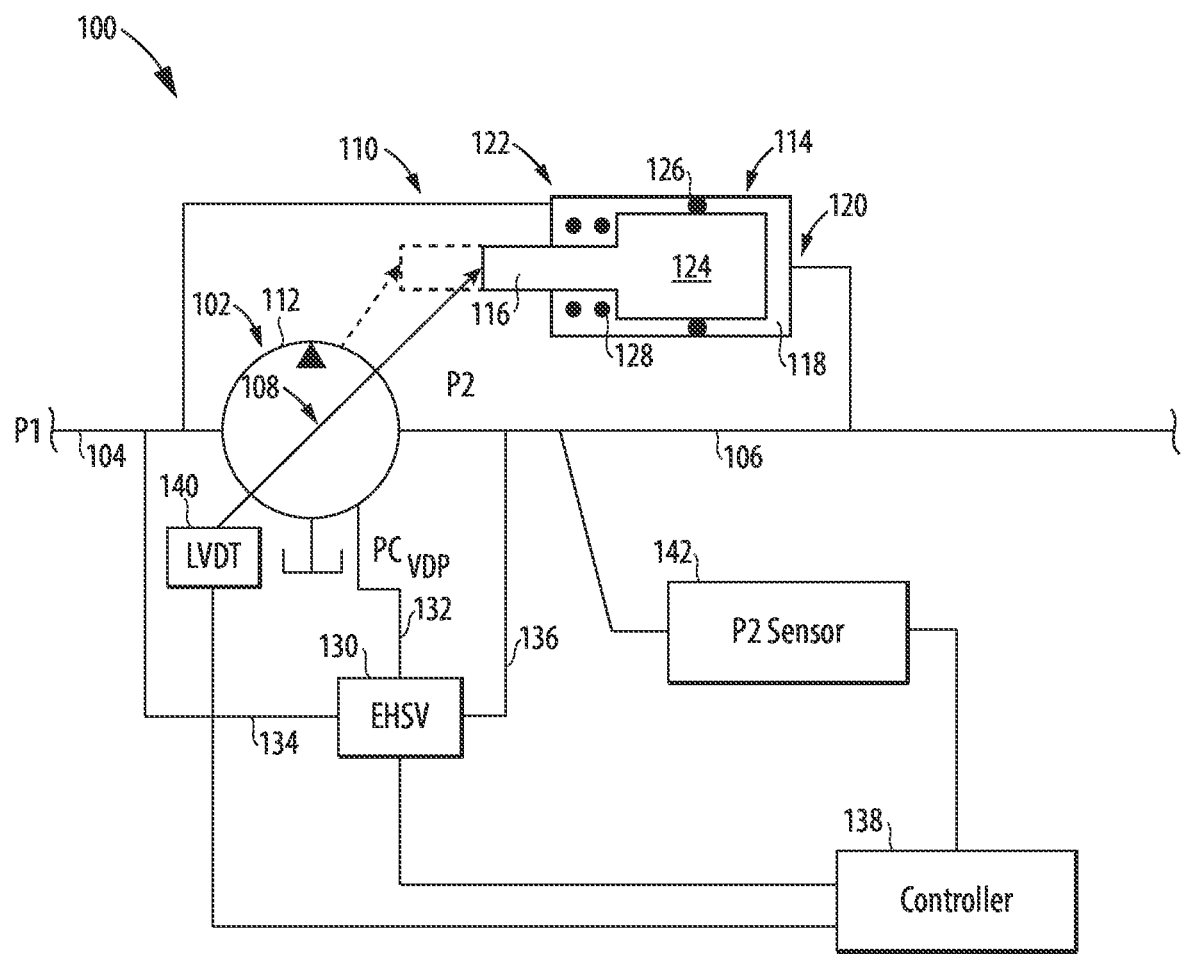

PRESSURE SENSITIVE STOP STROKE FOR VARIABLE DISPLACEMENT PUMPS

BACKGROUND

1. Field

The present disclosure relates to pump systems, and more particularly to variable displacement pumps such as used in aerospace fuel systems.

2. Description of Related Art

Variable displacement pumps need a minimum flow to overcome non-linear mechanical efficiencies to remain cool in operation. These minimum stops are designed around maximum operational pressures at minimum flows to ensure there is always enough flow to keep the pump mechanism's temperature under control.

The conventional techniques have been considered satisfactory for their intended purpose. However, there is an ever present need for improved systems and methods for minimum flow stops for variable displacement pumps. This disclosure provides a solution for this need.

SUMMARY

A system includes a variable displacement pump (VDP) in fluid communication with an inlet line and with an outlet line. The VDP includes a variable displacement mechanism configured to vary pressure to the outlet line. The VDP includes a variable stop configured to vary minimum displacement of the variable displacement mechanism based on position of the variable stop relative to a housing of the VDP. A pressure sensing valve (PSV) is operatively connected between the inlet line and the outlet line to actuate a stop member to adjust stopping position of the variable stop based on pressure differential between the inlet line and the outlet line.

The PSV can include an PSV housing, a first pressure port through the PSV housing, in fluid communication with the outlet line, a second pressure port through the PSV housing, in fluid communication with the inlet line, a valve member engaged inside the PSV housing for sliding movement relative to the PSV housing. The valve member can separate for fluid isolation between the first and second pressure ports, and can be configured to move within the PSV under changes in differential pressure between the inlet line and the outlet line. A biasing member can be operatively connected between the PSV housing and the valve member to bias the valve member in a first direction. The stop member of the PSV can include a piston rod extending from the valve member, and out through the PSV housing so movement of the valve member moves the piston rod.

An electrohydraulic servo valve (EHSV) can be connected in fluid communication with the variable displacement mechanism by a control line for control of flow through the VDP. The EHSV can be connected in fluid communication with both the inlet line and with the outlet line through respective connection lines. The EHSV can be operatively connected to a controller for active control of the EHSV to actuate the variable displacement mechanism to control flow through the VDP. A position sensor can be operatively connected to the variable displacement mechanism to provide sensor output indicative of position of the variable displacement mechanism. The position sensor can be operatively connected to the controller to provide feedback for controlling the variable displacement mechanism. The position sensor can include a linear variable differential transformer (LVDT). A pressure sensor can be operatively connected to the outlet line to generate sensor output indicative of pressure in the outlet line. The pressure sensor can be operatively connected to the controller for active control of the variable displacement mechanism based on pressure in the outlet line.

A method includes operating a variable displacement pump (VDP) at a first pressure differential across an inlet line and an outlet line of the VDP. Operating the VDP at the first pressure differential includes enforcing a first minimum displacement on a variable displacement mechanism of the VDP. The method includes operating the VDP at a second pressure differential across the inlet line and the outlet line, wherein operating the VDP at the second pressure differential includes enforcing a second minimum displacement on the variable displacement mechanism.

The first pressure differential can be greater than the second pressure differential. The first minimum displacement can be set for a higher flow rate than is the second minimum displacement. The method can include moving a mechanical stop of the variable displacement mechanism to change from enforcing the first minimum displacement to enforcing the second minimum displacement. Moving the mechanical stop can include moving a piston rod of an PSV operatively connected in fluid communication with the inlet line and with the outlet line to move the piston rod in response to changes in pressure differential between the inlet line and the outlet line. Moving the mechanical stop can include moving the piston rod against a biasing member of the PSV.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain FIGURES, wherein:

FIG. 1 is a schematic view of an embodiment of a system constructed in accordance with the present disclosure, showing the variable displacement pump and the variable stop mechanism.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used to remove the constraint of a fixed minimum pump stop in a variable displacement pump (VDP).

The system 100 includes a variable displacement pump (VDP) 102 in fluid communication with an inlet line 104 and with an outlet line 106. The VDP 102 includes a variable displacement mechanism 108 configured to vary pressure to the outlet line 106. The VDP 102 includes a variable stop 110 (indicated by the double headed arrow in FIG. 1) configured to vary minimum displacement of the variable displacement mechanism 108 based on position of the variable stop 110 relative to the housing 112 of the VDP 102. A pressure sensing valve (PSV) 114 is operatively connected in fluid communication between the inlet line 104 and the outlet line 106 to actuate a stop member 116, e.g. a piston rod, to adjust stopping position of the variable stop 110 based on pressure differential between the inlet line 104 and the outlet line 106, i.e. based on P2–P1.

The PSV 114 includes an PSV housing 118, a first pressure port 120 through the PSV housing in fluid communication with the outlet line 106, a second pressure port 122 through the PSV housing in fluid communication with the inlet line 104, and a valve member 124 engaged inside the PSV housing for sliding movement relative to the PSV housing, e.g. a seal 126 allows movement of the valve member 124 to slide within the PSV housing 118 without fluid flowing between the first and second pressure ports 120, 122. The valve member 124 separates for fluid isolation between the first and second pressure ports 120, 122, and is configured to move within the PSV housing 118 under changes in differential pressure between the inlet line 104 and the outlet line 106, i.e. the position of the valve member changes if P2–P1 changes. A biasing member 128, such as a spring or other resilient component, is operatively connected between the PSV housing 118 and the valve member 124 to bias the valve member 124 in a first direction, e.g. to the right as oriented in FIG. 1. The stop member 116 of the PSV 114 includes a piston rod extending from the valve member 124, and out through the PSV housing 118 so movement of the valve member 124 moves the piston rod. The piston rod in turn provides a mechanical stop for the variable displacement mechanism 108, i.e. the variable displacement mechanism 108 cannot move any further to the right as oriented in FIG. 1 than the end of the piston rod 116. FIG. 1 shows a second position of the piston rod 116 in broken lines, and in that second position, the variable displacement mechanism 108 cannot move beyond that stop to the right as oriented in FIG. 1, as indicated by the broken line with arrow head.

An electrohydraulic servo valve (EHSV) 130 is connected in fluid communication with the variable displacement mechanism 108 by a control line 132 for control of flow through the VDP 102. The EHSV 130 is connected in fluid communication with both the inlet line 104 and with the outlet line 106 through respective connection lines 134, 136. The EHSV 130 is operatively connected to a controller 138 for active control of the EHSV 130 to actuate the variable displacement mechanism 108 to control flow through the VDP 102. A position sensor 140 is operatively connected to the variable displacement mechanism 108 to provide sensor output indicative of position of the variable displacement mechanism 108. The position sensor 140 is operatively connected to the controller 138 to provide feedback for controlling the variable displacement mechanism 108. The position sensor 140 includes a linear variable differential transformer (LVDT). A pressure sensor 142 is operatively connected to the outlet line 106 to generate sensor output indicative of pressure in the outlet line 106. The pressure sensor 142 is operatively connected to the controller 138 for active control of the variable displacement mechanism 108 based on pressure P2 in the outlet line 106.

A method includes operating the VDP at a first pressure differential (P2–P1=D1) across the inlet line 104 and the outlet line 106 of the VDP 102. Operating the VDP 102 at the first pressure differential D1 includes enforcing a first minimum displacement on a variable displacement mechanism 108 of the VDP, e.g. the position of the stop 110 indicated in solid lines in FIG. 1. The method includes operating the VDP 102 at a second pressure differential (P2–P1=D2) across the inlet line 104 and the outlet line 106, wherein operating the VDP 102 at the second pressure differential D2 includes enforcing a second minimum displacement on the variable displacement mechanism 108, e.g. the position of the stop 110 indicated with broken lines in FIG. 1. For instance, the first pressure differential D1 can be greater than the second pressure differential D2, D1>D2. The first minimum displacement, e.g. at D1, can be set for a higher flow rate than is the second minimum displacement, allowing for lower flow rates when the pressure differential is lower at D2. The method includes moving a mechanical stop 110 of the variable displacement mechanism 108 to change from enforcing the first minimum displacement to enforcing the second minimum displacement. Moving the mechanical stop includes moving a piston rod 116 of the PSV 114 to move the piston rod 116 in response to changes in pressure differential between the inlet line 104 and the outlet line 106. Moving the mechanical stop 110 includes moving the piston rod 116 against a biasing member 128 of the PSV 114.

Systems and methods as disclosed herein can take discharge pressure against a bias spring and allow for the variation in apparent position of the stop that attenuates the movement of a variable displacement pump. It is possible that this could be used for maximum displacement, in an application where variable maximum displacement is appropriate.

Systems and methods as disclosed herein provide potential benefits including the following. The minimum stop in a variable displacement pump is beneficial since the mechanical efficiency of the pump is non-linear at lower displacements. The mechanical efficiency is also a function of the pressure rise in the fluid across the pump. So a variable displacement pump can tolerate a lower minimum displacement for a lower pressure rise. Systems and methods as disclosed herein can in turn reduce the amount of parasitic energy loss consumed at low pressures due to the reduced displacement needs.

The methods and systems of the present disclosure, as described above and shown in the drawings, provide for the ability to remove the constraint of a fixed minimum pump stop in a variable displacement pump (VDP). While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
    a variable displacement pump (VDP) in fluid communication with an inlet line and with an outlet line, wherein the VDP includes a variable displacement mechanism configured to vary pressure to the outlet line, wherein the VDP includes a variable stop configured to vary minimum displacement of the variable displacement mechanism based on position of the variable stop relative to a housing of the VDP; and
    a pressure sensing valve (PSV) operatively connected between the inlet line and the outlet line to actuate a stop member to adjust stopping position of the variable stop based on pressure differential between the inlet line and the outlet line; wherein the PSV includes:

an PSV housing;
a first pressure port through the PSV housing, in fluid communication with the outlet line;
a second pressure port through the PSV housing, in fluid communication with the inlet line; and
a valve member engaged inside the PSV housing for sliding movement relative to the PSV housing, wherein the valve member separates for fluid isolation between the first and second pressure ports, and is configured to move within the PSV under changes in differential pressure between the inlet line and the outlet line.

2. The system as recited in claim 1, further comprising a biasing member operatively connected between the PSV housing and the valve member to bias the valve member in a first direction.

3. The system as recited in claim 2, wherein the stop member of the PSV includes a piston rod extending from the valve member, and out through the PSV housing so movement of the valve member moves the piston rod.

4. The system as recited in claim 1, further comprising an electrohydraulic servo valve (EHSV) connected in fluid communication with the variable displacement mechanism by a control line for control of flow through the VDP.

5. The system as recited in claim 4, wherein the EHSV is connected in fluid communication with both the inlet line and with the outlet line through respective connection lines, wherein the EHSV is operatively connected to a controller for active control of the EHSV to actuate the variable displacement mechanism to control flow through the VDP.

6. The system as recited in claim 5, further comprising a position sensor operatively connected to the variable displacement mechanism to provide sensor output indicative of position of the variable displacement mechanism, wherein the position sensor is operatively connected to the controller to provide feedback for controlling the variable displacement mechanism.

7. The system as recited in claim 6, wherein the position sensor includes a linear variable differential transformer (LVDT).

8. The system as recited in claim 5, further comprising a pressure sensor operatively connected to the outlet line to generate sensor output indicative of pressure in the outlet line, wherein the pressure sensor is operatively connected to the controller for active control of the variable displacement mechanism based on pressure in the outlet line.

9. A method for operating a system,
the system comprising:
a variable displacement pump (VDP) in fluid communication with an inlet line and with an outlet line, wherein the VDP includes a variable displacement mechanism configured to vary pressure to the outlet line, wherein the VDP includes a variable stop configured to vary minimum displacement of the variable displacement mechanism based on position of the variable stop relative to a housing of the VDP; and
a pressure sensing valve (PSV) operatively connected between the inlet line and the outlet line to actuate a stop member to adjust stopping position of the variable stop based on pressure differential between the inlet line and the outlet line; wherein the PSV includes:
an PSV housing;
a first pressure port through the PSV housing, in fluid communication with the outlet line;
a second pressure port through the PSV housing, in fluid communication with the inlet line; and
a valve member engaged inside the PSV housing for sliding movement relative to the PSV housing, wherein the valve member separates for fluid isolation between the first and second pressure ports, and is configured to move within the PSV under changes in differential pressure between the inlet line and the outlet line;
the method comprising:
operating the variable displacement pump (VDP) at a first pressure differential across the inlet line and the outlet line of the VDP, wherein operating the VDP at the first pressure differential includes enforcing a first minimum displacement on the variable displacement mechanism of the VDP; and
operating the VDP at a second pressure differential across the inlet line and the outlet line, wherein operating the VDP at the second pressure differential includes enforcing a second minimum displacement on the variable displacement mechanism.

10. The method as recited in claim 9, wherein the first pressure differential is greater than the second pressure differential.

11. The method as recited in claim 10, wherein the first minimum displacement is set for a higher flow rate than is the second minimum displacement.

12. The method as recited in claim 9, further comprising moving a mechanical stop of the variable displacement mechanism to change from enforcing the first minimum displacement to enforcing the second minimum displacement.

13. The method as recited in claim 12, wherein moving the mechanical stop includes moving a piston rod of an PSV operatively connected in fluid communication with the inlet line and with the outlet line to move the piston rod in response to changes in pressure differential between the inlet line and the outlet line.

14. The method as recited in claim 13, wherein moving the mechanical stop includes moving the piston rod against a biasing member of the PSV.

15. A system comprising:
a variable displacement pump (VDP) in fluid communication with an inlet line and with an outlet line, wherein the VDP includes a variable displacement mechanism configured to vary pressure to the outlet line, wherein the VDP includes a variable stop configured to vary minimum displacement of the variable displacement mechanism based on position of the variable stop relative to a housing of the VDP; and
a pressure sensing valve (PSV) is connected in fluid communication with the inlet line and the outlet line to actuate a stop member to adjust stopping position of the variable stop based on pressure differential between the inlet line and the outlet line; and
an electrohydraulic servo valve (EHSV) connected in fluid communication with the variable displacement mechanism by a control line for control of flow through the VDP, wherein the EHSV is connected in fluid communication with both the inlet line and with the outlet line through respective connection lines.

16. The system as recited in claim 15, wherein the EHSV is operatively connected to a controller for active control of the EHSV to actuate the variable displacement mechanism to control flow through the VDP.

17. The system as recited in claim 16, further comprising a position sensor operatively connected to the variable displacement mechanism to provide sensor output indicative of position of the variable displacement mechanism, wherein the position sensor is operatively connected to the controller to provide feedback for controlling the variable displacement mechanism.

18. The system as recited in claim 17, wherein the position sensor includes a linear variable differential transformer (LVDT).

19. The system as recited in claim 16, further comprising a pressure sensor operatively connected to the outlet line to generate sensor output indicative of pressure in the outlet line, wherein the pressure sensor is operatively connected to the controller for active control of the variable displacement mechanism based on pressure in the outlet line.

* * * * *